United States Patent [19]

Swank

[11] 3,770,470

[45] *Nov. 6, 1973

[54] PIGMENTED RESIN COMPOSITIONS
[75] Inventor: Thomas F. Swank, Chelmsford, Mass.
[73] Assignee: Cabot Corporation, Boston, Mass.
[ * ] Notice: The portion of the term of this patent subsequent to Aug. 11, 1987, has been disclaimed.
[22] Filed: Dec. 13, 1972
[21] Appl. No.: 314,509

Related U.S. Application Data
[63] Continuation-in-part of Ser. No. 872,389, Oct. 29, 1969.

[52] U.S. Cl.................. 106/193 J, 106/300, 260/37, 260/41, 260/41.5
[51] Int. Cl....... C09c 1/36, C08b 27/02, C09c 3/02
[58] Field of Search.......................... 106/300, 193 J

[56] References Cited
UNITED STATES PATENTS
2,868,663  1/1959  Jarmus............................ 106/193 J
3,523,810  8/1970  Swank............................... 106/300
3,595,822  7/1971  Swank............................... 106/300

Primary Examiner—Theodore Morris
Attorney—Kenneth W. Brown et al.

[57] ABSTRACT

This disclosure relates to the use of titanium dioxide coated with a boehmite-type alumina having an average crystallite size of at least about 50 angstroms as a pigment for thermoplastic resins.

10 Claims, No Drawings

PIGMENTED RESIN COMPOSITIONS

This application is a continuation-in-part application of U. S. Ser. No. 872,389 filed on Oct. 29, 1969.

This invention relates to new and useful resinous compositions. In particular, this invention relates to new and improved pigmented thermoplastic resinous compositions containing titanium dioxide-based pigments coated with a boehmite-type alumina having an average crystallite size of at least about 50 angstroms.

In many instances, it is desirous that thermoplastic resins, particularly vinyl halide resins, be combined with pigments to improve the color of the resins. For various applications in the plastics industry, such as in automobile upholstery, canister sets, refrigerator liners, place mats, packages, toys, siding for homes and the like, a properly colored thermoplastic resin composition is important in promoting wide acceptance. Since at least some of th pigment is ordinarily retained in the plastic product, it is desirable that it possess certain characteristics. Among the desirable characteristics is the ability of a pigment to impart superior color to the resulting product. Furthermore, it is desirable that the pigment be one which is readily dispersible and has little, if any, tendency to form agglomerates which cause color streaks in the finished product.

It is accordingly an object of this invention to provide improved thermoplastic resinous compositions.

It is a further object of this invention to provide novel plastic compositions comprising thermoplastic resins and titanium dioxide-based pigments coated with a boehmite-type alumina having an average crystallite size of at least about 50 angstroms.

A still further object is to provide new resinous compositions having desirable physical properties.

Other objects and advantages of the invention will be apparent to those skilled in the art from the following detailed description and claims.

In accordance with this invention, it has been found that the above and still further objects are achieved by incorporating a thermoplastic resin and titanium dioxide-based pigments coated with a boehmite-type alumina having an average crystallite size of at least about 50 angstroms.

Generally speaking, the pigment additive of the present invention is utilized in amounts of from about 0.1 to about 80 percent by weight of the pigmented resin composition. More preferably, the pigment additive of the present invention is used in amounts of from about 0.5 to about 20 percent by weight of the pigmented resin composition with a preferred embodiment ranging from about 2 to about 10 percent by weight of the pigmented resin composition.

The products of this invention are effective as pigments for thermoplastic resins and rubber-like materials. Examples of thermoplastic resins suitable for use with this invention include vinyl halide polymers or copolymers such as polyvinyl chloride and vinyl chloride-vinyl acetate copolymers, vinylidene halide polymers or copolymers such as polyvinylidene chloride and polyvinylidene fluoride, polyvinyl acetate, polyvinyl butyral, polyvinyl acetal, lower alkyl cellulose ethers such as methyl cellulose, ethyl cellulose, butyl cellulose and aralkyl cellulose ethers such as benzyl cellulose, cellulose esters of organic acids having 2 to 4 carbon atoms such as cellulose acetate, cellulose propionate, cellulose butyrate, cellulose acetate-butyrate and cellulose acetate-propionate, vinyl aromatic resins such as polystyrene, rubbery polymers such as the copolymers of butadiene with styrene or acrylonitrile and the terpolymer of acrylonitrile, butadiene and styrene, polysulfides, oil-modified and unmodified alkyd resins prepared from dihydroxy alcohols and dicarboxylic acids, polycarbonates, polyamides and polymers of α-mono-olefins having 2 to 10 carbon atoms such as the polymers and copolymers of ethylene, propylene, butene-1 and the like. Polymers of methyl methacrylate suitable for use in the practice of this invention include homopolymers of methyl methacrylate or copolymers with minor amounts, for example, up to 25 percent by weight, of another ethylenically unsaturated monomer copolymerizable therewith, for example, acrylic acid, methacrylic acid, the 1 to 4 carbon alkyl (i.e., methyl to butyl) esters of acrylic acid, the 2 to 4 carbon alkyl (i.e., ethyl, propyl and butyl) esters of methacrylic acid, vinyl acetate, acrylonitrile, various amides and styrene.

This invention is particularly applicable to halogen-containing vinyl resins. Thus, there may be employed resins derived from such vinyl compounds as vinyl chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide, such as vinyl chloride, with other monomers such as vinylidene chloride; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene ortho-chlorostyrene, para-chlorostyrene, 2,5-dichlorostyrene, 2,4-dichlorostyrene, para-ethyl styrene, vinyl naphthalene, α-methyl styrene, dienes such as butadiene and chlorobutadiene; unsaturated amides such as acrylic acid amide and acrylic acid anilide; unsaturated nitriles such as acrylic acid nitrile; esters of α,β-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. It should be recognized that the halogenated resins containing halogens other than chlorine, e.g., bromine, fluorine and iodine, are also operable in this invention. The halogenated resins may contain a varying proportion of halogen, depending upon the nature of the resin and its contemplated use. Those copolymers in which a predominant portion, i.e., more than 50 percent by weight of the copolymer, is made from a halogen-containing vinylidene monomer such as vinyl chloride represent a preferred class of polymers to be treated according to this invention.

The pigments utilized in the thermoplastic resinous compositions of the present invention include titanium dioxide-based pigments coated with a boehmite-type alumina having an average crystallite size of at least about 50 angstroms. In general, a titanium dioxide-based pigment coated with an amount of from about 0.5 to about 10 percent of the alumina based on the weight of the titanium dioxide is appropriate for practicing the invention. In a preferred embodiment of the present invention, however, products comprising titanium dioxide-based pigments coated with an amount of from about 1.5 to about 6 percent by weight of alumina based on the weight of the titanium dioxide are employed as the pigments for the thermoplastic resinous compositions.

The titanium dioxide substrate employed in the preparation of the present pigments may be readily prepared by methods well-known in the art. For example, a titanium dioxide product prepared by the sulfate process or the chloride process is suitable although titanium dioxide prepared by the chloride process is particularly advantageous. However, the titanium dioxide starting material utilized in accordance with this invention should have an average particle diameter of between about 150 and about 400 millimicrons. Preferably, a pyrogenic titanium dioxide substrate having an average particle diameter of between about 180 and 300 millimicrons is utilized.

The titanium dioxide pigments having coated thereon a boehmite-type alumina having an average crystallite size of at least about 50 angstroms may be prepared by either of two processes, one of which entails the use of a base-yielding aluminum salt such as sodium aluminate and the like, the other of which entails the use of an acid-yielding aluminum salt such as aluminum sulfate and the like.

When utilizing the process involving a base-yielding aluminum salt such as sodium aluminate, calcium aluminate, and the like, the precipitated alumina will be sufficiently well crystallized if the precipitation is carried out at a temperature ranging from about 20° to about 100°C. with neutralizing quantities of an acid such as acetic acid, hydrochloric acid, nitric acid, sulfuric acid, and the like. In this process, the base-yielding aluminum salt is added to a basic slurry of titanium dioxide, for example, a slurry maintained at a pH of from 7 to 10, and preferably at a pH of from 8 to 10. Following a neutralization step to precipitate alumina, the slurry is subjected to a relatively mild aftertreatment. This aftertreatment can be carried out at a pH of from 7 to 10 at a temperature of from about 40°C. or higher for at least 5 minutes. In practice, the higher the temperature used, the shorter the required aftertreatment and the lower the pH required to obtain a desirable boehmite-type alumina crystalline structure. For the purposes of the present invention, the boehmite-type structure of the alumina added by the aftertreatment comprises crysallites having an average diameter of at least 50 angstroms. The size may be measured by x-ray diffraction techniques as interpreted by the Scherrer relationship $$T = (0.9 \, l / B \cos x)$$

$T$ = crystallite size
$l$ = wave-length of x-rays in angstrom units
$x$ = spectrometer angle at which the peak occurs The crystallite sizes disclosed in the working examples herein were obtained by averaging four different values of T. These values were those calculated with angles corresponding to the four major peaks which characterize the boehmite on an x-ray diffraction pattern.

In an alternate process for preparing the particular pigments useful in preparing the thermoplastic resinous compositions, the crystalline boehmite-type alumina is precipitated by neutralizing an acid solution such as an aluminum sulfate or aluminum chloride solution. The precipitation is readily carried out with organic or inorganic bases, such as sodium carbonate or ammonia, and the like, which will not yield any undesirable precipitate during the neutralization procedure. Furthermore, in the process wherein acidic solution are neutralized, it is advantageous to age the boehmite-type alumina coated pigment for a period of from about 1 to 24 hours at a temperature of from about 70° to 100°C. However, a substantially crystalline boehmite-type alumina may be obtained by curing the slurry for about 1 hour at a temperature of 95°C. As hereinbefore indicated, the use of higher temperatures or higher pH conditions tends to reduce the curing time required to obtain a 50 angstrom crystallite.

Additionally, if desired, a silicate compound may be incorporated as a dispersing aid in a titanium dioxide slurry prior to any aftertreatment process. The amount of additive may vary from about 0.05 to about 4 percent by weight based on the titanium dioxide.

A further embodiment of the present invention entails applying an initial coating to the titanium dioxide starting material of a hydrate or oxide of titania prior to, simultaneously with, or after the application of the coating of crystalline boehmite-type alumina. Any soluble titanium compound such as titanium tetrachloride, titanium sulfate, tetraethyl titanate and the like can be utilized for the purpose of applying the titania coating. However, titanium tetrachloride is preferred. The amount of hydrate or oxide of titania precipitated onto the titanium dioxide surface should be slight inasmuch as it tends to interfere with the crystallizing of the alumina deposited according to the process of the invention. In general, a coating of between about 0.5 and about 2.5 percent of titania by weight of the titanium dioxide starting material is entirely suitable.

The invention will be more readily understood by reference to the following examples which describe the use of the pigments of the present invention in the preparation of thermoplastic resinous compositions. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following illustrate the preparation of titanium dioxide-based pigments of the present invention as well as the preparation of a conventional titanium dioxide-based pigment aftertreated with amorphous alumina.

EXAMPLE 1

Into a one gallon ball mill there are charged 430 grams of water, 20.16 mls. of sodium silicate, and 1,000 grams of a titanium dioxide base pigment. The mill is agitated for 2 hours at 50 rpm with a ball charge of 4.1 lbs. of three-fourths inch porcelain balls.

At the end of the 2-hour period the ball-milled slurry is discharged and the mill is twice washed with 890 grams of water each time. The ball mill wash water is added to the slurry. The pH of the resultant mixture is 10.1.

A quantity of 738 mls. of a 32.7% $Al_2(SO_4)_3 \cdot 18H_2O$ solution is added to the slurry bringing the pH to about 3.35. The slurry is then rapidly neutralized with 1,220 ml. of a 13 percent sodium carbonate. The resultant pH of the slurry is 7.02. The resultant slurry is filtered immediately on a Buchner filter and washed with about 8 liters of water.

The alumina on the titanium dioxide is amorphous and the crystallite size of the alumina is such that the average crystallite diameter is less than 20 angstroms.

EXAMPLE 2

Charged into a ball mill and agitated for a period of 2 hours as described in Example 1 are 430 grams of water, 20.16 mls. of a sodium silicate solution containing 0.1 grams sodium silicate per ml., and 1,000 grams of a titanium dioxide pigment. The ball-milled slurry, together with the ball mill wash water obtained as described in Example 1, is heated to 70°C. The pH is determined to be 9.00.

250.5 grams of concentrated $Na_2Al_2O_4$ solution (28.5 grams $Al_2O_3$ per 100 mls. of solution) are added to the slurry bringing the pH to about 10.9. Neutralization is carried out by reducing the pH to 6.97 with hydrochloric acid over a 25 minute period. The pH is then raised to 9.0 with 13 percent sodium carbonate solution. After further heating for 30 minutes at 70°C, the slurry is filtered and the resultant filter cake is washed with 8 liters of water.

The alumina on the titanium dioxide is a highly crystalline, boehmite-type alumina. Average diameter of the boehmite crystallite is 79 angstroms.

EXAMPLE 3

In this example there is prepared a titanium dioxide based pigment coated with 5 percent by weight of the titanium dioxide of boehmite-type alumina and 0.2 percent of silica by weight of the titanium dioxide.

A 1 gallon ball mill is charged with 410 grams of water, 20.2 mls. of a sodium silicate solution containing 0.0992 equivalent grams of $SiO_2$ per ml. and 1,000 grams of titanium dioxide. After ball-milling for 2 hours, the slurry is removed and the ball mill is washed with two 890 ml. portions of water. The wash water is added to the slurry and the slurry is then heated to 70°C. with continuous agitation. The pH of the slurry is 9.10.

To this slurry are added 747.4 mls. of an aluminum sulfate solution containing the equivalent of 0.0663 grams of $Al_2O_3$ per ml. of solution whereby the pH is lowered to 2.57. Next, 1,200 mls. of a 13 percent sodium carbonate solution is added raising the pH of the slurry to 8.18. After curing for 2 hours at 90°C., the material is washed and dried in an oven for about 14 hours at a temperature of 110°C.

The alumina deposited on the surface of the titanium dioxide is of boehmite-type but somewhat less crystalline than the alumina deposited in Example 2. Average crystallite diameter of the boehmite-type alumina is about 65 angstroms.

EXAMPLE 4

A slurry comprising 430 grams of water and 1,000 grams of $TiO_2$ is ball milled, augmented with ball-mill wash water and heated at 70°C in accordance with the preceeding examples. The pH of the slurry is determined to be 5.88.

747.4 mls. of an aluminum sulfate solution (containing the equivalent of 0.066 grams per ml. of solution) are added to the slurry and the pH is lowered to about 2.5. After neutralizing to a pH value of 8.13 with 1,180 ml. of 13 percent sodium carbonate solution, the slurry is heated to 80°C. for 60 minutes. The average diameter of the crystallite boehmite-type alumina is found to be 54 angstroms.

EXAMPLE 5

Into a 1 gallon ball mill there are charged 2,330 mls. of water, 7 mls. of a sodium silicate solution containing the equivalent of 0.1 grams $SiO_2$ per ml. and 1,000 grams of a titanium dioxide base pigment. The slurry is agitated for two hours with a ball charge of 3,770 grams of three-fourths inch porcelain balls. At the end of the 2 hour period the ball-milled sulrry is discharged and the mill is washed with 660 mls. of water. The wash water is added to the slurry, the pH of which is found to be 4.4.

To the slurry there are added 189 mls. of an aluminum sulfate solution containing 0.11 grams of alumina per ml. of solution thereby reducing the pH of the slurry to about 3.75. The slurry is then neutralized with 440 mls. of 2.7N sodium carbonate solution. The pH of the resultant slurry is 7.0. The slurry is then cured for 30 minutes, filtered and washed with about 8 liters of water.

The product obtained comprises a titanium dioxide-based pigment coated with 2 percent by weight thereof of alumina which is amorphous and has an average crystallite diameter of less than 50 angstroms.

EXAMPLE 6

Following the procedure of Example 5 there is prepared an aqueous ball-milled slurry containing 1,000 grams of titanium dioxide. The slurry is heated to a temperature of 70°C. and the pH of the slurry is found to be 4.7. To the slurry are added 189 mls. of an aluminum sulfate solution containing 0.11 grams of alumina per ml. of solution followed by 571 mls. of 2.7 N sodium carbonate solution. The pH of the resultant slurry is 9.0 at which pH the slurry is then cured for 3 hours. After the curing period, the slurry is filtered and washed with about 8 liters of water.

The resultant product comprises a titanium dioxide-based pigment coated with 2 percent by weight thereof of a boehmite-type alumina having an average crystallite size greater than 50 angstroms.

EXAMPLE 7

In accordance with the procedure of Example 5, an aqueous ball-milled slurry containing 1,000 grams of titanium dioxide and having a pH of 4.7 is prepared. The slurry is heated to a temperature of 70°C. There is then added to the slurry 200 mls. of a 10 percent sodium aluminate solution bringing the pH of the slurry to 11.3 followed by 168 mls. of 3N sulfuric acid to lower the pH to 9.0. The slurry is cured for 1 hour at the pH value of 9.0, and then for 5 minutes at a pH of 7.0. The slurry is filtered and washed with about 8 liters of water.

The product prepared in this manner comprises a titanium dioxide-based substrate coated with 2 percent by weight thereof of a boehmite-type alumina having an average crystallite size greater than 50 angstroms.

The pigmented thermoplastic resinous compositions of this invention are readily prepared by mechanical methods well known in the art. The thermoplastic resin and the pigmentary additive are intimately admixed together on a conventional mixing machine of the type normally used for mixing rubber or plastics such as a mill roll, an extruder, a ball mill provided with a small number of balls or a Banbury mixer. Preferably, the thermoplastic resin is first placed on a mill roll and after a small rolling bank has formed in the nip of the rolls, the pigment is added. The thermoplastic resin and the pigmentary additive can also be mixed together to from a crude admixture which is then placed on a mill roll. Regardless of the method by which the mixing of these materials is achieved, it is necessary that the materials be mixed together or worked under a sufficient heat and pressure to insure an efficient dispersion of the pigment in the thermoplastic resin so as to form a completely homogeneous material. The temperature at which this working or mastication is carried out is not critical, as long as the temperature is at least above the temperature where the thermoplastic resin fuses and below the temperature where decomposition occurs.

The following testing procedure is used in evaluating the physical properties and efficiency of the boehmite-type alumina aftertreated titanium dioxide products of this invention as pigments for thermoplastic resins. A composition comprising 400 grams of polyvinyl chloride resin, 160 grams of dioctyl phthalate plasticizer, 20 grams of "Paraplex G-62," an epoxidized soybean oil plasticizer sold by Rohm and Haas Company, 8 grams of stabilizer and 16 grams of the particular titanium dioxide pigment is mixed on a two roll mill at a temperature of 315°F. for 6 minutes to a homogeneous blend. To the mill there are again charged 300 grams of the sheeted composition and milling is carried out for about one minute until a flux-like consistency is obtained. Added to the flux-like composition are 12 grams of a black masterbatch comprising 400 grams of polyvinyl chloride resin, 160 grams of dioctyl phthalate plasticizer, 20 grams of "Paraplex G-62," 8 grams of stabilizer and 16 grams of carbon black. The resulting mixture is then milled for an additional five minutes and extruded into a flat sheet having a thickness of 45 mils which sheet is thereafter cut into square samples measuring 6 inches.

The pigments described herein are tested for dispersion characteristics in a thermoplastic resin such as polyvinyl chloride and the dispersibility is rated numerically from a value of 0 to 10, the higher the number being indicative of poor dispersion. More particularly, the dispersibility of the pigment is determined by visually examining with the aid of a magnifying glass a six inch square sample of milled sheet and counting the number of comets or non-dispersible agglomerates appearing thereon.

The color characteristics, i.e., tinting strength and undertone, of the pigmented resin composition are determined on a 6 inch square sample of the composition using a tristimulus colorimeter known as the "Coloreye" produced by Instrument Development Laboratories, Inc., of Attleboro, Massachusetts, and described in detail in their "Instruction Manuel No. 1000 G for Model D Coloreye." In particular, the "Coloreye" measures light reflectance values of a test panel, pigmented with the particular treated pigment of the present invention, compared to the corresponding reflectance values of a control sample at three wavelengths in the visible light spectrum. The three wavelengths are designated as X, Y and Z and are substantially amber, green and blue wavelengths respectively. The tinting strength or hiding power which a pigment contributes to a thermoplastic resinous composition is evaluated in terms of the "Y" value or the green reflectance value. Undertone, or the blueness contributed by a pigment, is measured in terms of a "Yellowness Factor" (YF) which is determined in accordance with the formula $(X-Z)/Y$. For purposes of the present invention, the control sample which is an amine-treated conventional plastic grade titanium dioxide pigment is assigned an arbitrary value of 100(%) for both tinting strength and undertone.

EXAMPLE 8

In accordance with the above testing procedure there are prepared 6 inch square samples of pigmented polyvinyl chloride resinous materials utilizing the pigments of Example 5, 6 and 7. Specifically, there is prepared a first sample wherein the pigment as shown in Example 5 comprises titanium dioxide coated with 2 percent by weight of the titanium dioxide of an amorphous-type alumina having a crystalline size less than 50 angstroms. Results obtained for this product indicated a tinting strength value of 95.94 percent, an undertone value of 103.74 percent and the presence of 2 comets as evidenced by streaks of undispersed titanium dioxide pigment in the resinous material.

In a second sample there is utilized a pigment prepared in accordance with the method of Example 6 which comprises titanium dioxide coated with 2 percent by weight of the titanium dioxide of a boehmite-type alumina having an average crystalline size greater than 50 angstroms. Testing of this material reveals a tinting strength value of 102.18 percent and an undertone value of 108.93 percent when compared with the reference standard. No comets appeared in the surface of the 6 inch square sample.

A third pigmented polyvinyl chloride resin sample is prepared utilizing a pigment prepared according to the procedure of Example 5. The pigment is prepared by a process wherein sodium aluminate is employed and comprises titanium dioxide coated with 2 percent by weight of the titanium dioxide of a boehmite-type alumina having an average crystalline size greater than 50 angstroms. Results obtained on this sample indicate a tinting strength value of 101.80% and an undertone value of 109.31 percent when compared with the reference standard. There were no comets in the surface of the pigmented resin.

EXAMPLE 9

Following the procedure of Example 8 and substituting for the pigments utilized therein each of the pigmentary products of Examples 1, 2, 3 and 4, pigmented polyvinyl chloride resin samples are prepared. An evaluation of the samples reveals that test samples prepared with boehmite-type alumina treated pigments of Examples 2, 3 and 4 have tinting strength, undertone and dispersibility properties which are superior to those of the test sample prepared with the amorphous alumina treated pigment of Example 1.

Similar results are obtained when each of the above pigments utilized in Examples 8 and 9 are compared at levels of 5, 10, 15, 20, 30 and 40 percent of pigment based on the weight of the pigmented polyvinyl chloride resinous compositions.

The substitution of other vinyl halide-containing resins for the polyvinyl chloride used in the foregoing examples also results in effective pigmentation. For example, results similar to those obtained in the foregoing examples are obtained when the polyvinyl chloride is replaced by an equivalent amount of a copolymer of 95 parts vinyl chloride and 5 parts of vinyl acetate and a copolymer of 90 parts of vinyl chloride and 10 parts of vinylidene chloride.

EXAMPLE 10

Samples of cellulose acetate, cellulose acetate butyrate and cellulose acetate propionate are mixed on a two roll mill to a homogeneous blend with a titanium dioxide-based pigment coated with 2 percent by weight thereof of boehmite-type alumina having an average crystalline size greater than 50 angstroms in accordance with the procedure of Example 8. The resultant products are pressed into films and are found to possess excellent tinting strength and hiding power properties.

EXAMPLE 11

The procedure of Example 8 is repeated except that the polyvinyl chloride is replaced by each of several resins, namely, polyethylene, polypropylene, polycarbonate, polyvinyl butyral, polystyrene and a copolymer of 40 parts of styrene and 60 parts of acrylonitrile. In each instance, the pigmented resin composition exhibit physical properties comparable to those demonstrated in the previous examples.

For many purposes, it may be desirable to blend other conventional additives with the pigmented thermoplastic resinous compositions of the present invention. Illustrative of such additives are plasticizers, dyes, heat and light stabilizers, lubricants and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A composition of matter consisting essentially of a thermoplastic resin and a pigment consisting essentially of titanium dioxide coated with a boehmite-type alumina having an average crystallite size of at least about 50 angstroms, wherein said pigment is present in amounts of from about 0.1 to about 80 percent by weight of the composition.

2. A composition as defined in claim 1 wherein the pigment is present in amounts of from about 0.5 to about 20 percent by weight of the composition.

3. A compposition as defined in claim 1 wherein the pigment is present in amounts of from about 2 to about 10 percent by weight of the composition.

4. A composition as defined in claim 1 wherein the titanium dioxide is coated with an amount of from about 0.5 to about 10 percent of boehmite-type alumina based on the weight of the titanium dioxide.

5. A composition as defined in claim 1 wherein the titanium dioxide is coated with an amount of from about 1.5 to about 6 percent of boehmite-type alumina based on the weight of the titanium dioxide.

6. A composition as defined in claim 1 wherein the thermoplastic resin is a vinyl halide polymer selected from the group consisting of polymerized vinyl halide monomers and copolymers of such monomers with at least one dissimilar ethylenically unsaturated monomer.

7. A composition as defined in claim 1 wherein the thermoplastic resin is a cellulose ester of an organic acid having 2 to 4 carbon atoms.

8. A composition as defined in claim 1 wherein the thermoplastic resin is a polymer of an $\alpha$-monoolefin selected from the group consisting of homopolymers of $\alpha$-monoolefin monomers having from two to 10 carbon atoms and copolymers of such monomers with at least one dissimilar ethylenically unsaturated monomer.

9. A composition as defined in claim 1 wherein the thermoplastic resin is a monovinyl-substituted aromatic hydrocarbon polymer selected from the group consisting of polymerized monovinyl-substituted aromatic hydrocarbon monomers and copolymers of such monomers with at least one dissimilar ethylenically unsaturated monomer.

10. A composition as defined in claim 1 wherein the thermoplastic resin is polyvinyl chloride.

* * * * *